(12) United States Patent
Major et al.

(10) Patent No.: US 9,407,564 B2
(45) Date of Patent: *Aug. 2, 2016

(54) APPARATUS, SYSTEM, AND METHOD FOR ADAPTIVE-RATE SHIFTING OF STREAMING CONTENT

(71) Applicant: ECHOSTAR TECHNOLOGIES L.L.C., Englewood, CO (US)

(72) Inventors: Robert Drew Major, Orem, UT (US); Mark B. Hurst, Cedar Hills, UT (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,303

(22) Filed: Oct. 16, 2014

(65) Prior Publication Data

US 2015/0039782 A1 Feb. 5, 2015

Related U.S. Application Data

(63) Continuation of application No. 11/116,783, filed on Apr. 28, 2005, now Pat. No. 8,868,772.

(60) Provisional application No. 60/566,831, filed on Apr. 30, 2004.

(51) Int. Cl.
*H04L 12/853* (2013.01)
*H04L 12/825* (2013.01)
(Continued)

(52) U.S. Cl.
CPC ............... *H04L 47/25* (2013.01); *H04L 65/60* (2013.01); *H04N 21/25808* (2013.01);
(Continued)

(58) Field of Classification Search
None
See application file for complete search history.

(56) References Cited

U.S. PATENT DOCUMENTS 4,535,355 A 8/1985 Arn et al.
5,168,356 A 12/1992 Acampora et al.
(Continued)

FOREIGN PATENT DOCUMENTS

CA 2466482 5/2003
EP 0 711 077 A2 5/1996
(Continued)

OTHER PUBLICATIONS

Bill Birney, Intellegent Streaming, May 2003, all pages.*
(Continued)

*Primary Examiner* — Ninos Donabed
(74) *Attorney, Agent, or Firm* — Ingrassia Fisher & Lorenz, P.C.

(57) ABSTRACT

An apparatus for adaptive-rate shifting of streaming content includes an agent controller module configured to simultaneously request at least portions of a plurality of streamlets. The agent controller module is further configured to continuously monitor streamlet requests and subsequent responses, and accordingly request higher or lower quality streamlets. A staging module is configured to stage the streamlets and arrange the streamlets for playback on a content player. A system includes a data communications network, a content server coupled to the data communications network and having a content module configured to process content and generate a plurality of high and low quality streams, and the apparatus. A method includes simultaneously requesting at least portions of a plurality of streamlets, continuously monitoring streamlet requests and subsequent responses, and accordingly requesting higher or lower quality streamlets, and staging the streamlets and arranging the streamlets for playback on a content player.

16 Claims, 7 Drawing Sheets

(51) Int. Cl.
H04N 21/258 (2011.01)
H04N 21/2662 (2011.01)
H04N 21/643 (2011.01)
H04N 21/647 (2011.01)
H04N 21/84 (2011.01)
H04N 21/845 (2011.01)
H04L 29/06 (2006.01)

(52) U.S. Cl.
CPC ........ *H04N 21/2662* (2013.01); *H04N 21/643* (2013.01); *H04N 21/64769* (2013.01); *H04N 21/64792* (2013.01); *H04N 21/84* (2013.01); *H04N 21/845* (2013.01)

(56) References Cited

U.S. PATENT DOCUMENTS

| | | | |
|---|---|---|---|
| 5,267,334 A | 11/1993 | Normille et al. | |
| 5,404,446 A | 4/1995 | Bowater et al. | |
| 5,768,527 A | 6/1998 | Zhu et al. | |
| 5,841,432 A | 11/1998 | Carmel et al. | |
| 5,953,506 A | 9/1999 | Kalra et al. | |
| 6,091,775 A | 7/2000 | Hibi et al. | |
| 6,091,777 A | 7/2000 | Guetz et al. | |
| 6,122,660 A | 9/2000 | Baransky et al. | |
| 6,185,736 B1 | 2/2001 | Ueno | |
| 6,195,680 B1 | 2/2001 | Goldszmidt et al. ......... 709/203 | |
| 6,366,614 B1 | 4/2002 | Pian et al. ............... 375/240.02 | |
| 6,374,289 B2 | 4/2002 | Delaney et al. | |
| 6,389,473 B1 | 5/2002 | Carmel et al. | |
| 6,449,719 B1 | 9/2002 | Baker | |
| 6,486,803 B1 | 11/2002 | Luby et al. | |
| 6,490,627 B1 | 12/2002 | Kalra et al. | |
| 6,510,553 B1 | 1/2003 | Hazra | |
| 6,552,227 B2 | 4/2003 | Mendelovici et al. | |
| 6,574,591 B1 | 6/2003 | Kleiman et al. | |
| 6,604,118 B2 | 8/2003 | Kleiman et al. | |
| 6,618,752 B1 | 9/2003 | Moore et al. | |
| 6,654,790 B2 | 11/2003 | Ogle et al. | |
| 6,675,199 B1 | 1/2004 | Mohammed et al. | |
| 6,697,072 B2 | 2/2004 | Russell et al. | |
| 6,721,723 B1 | 4/2004 | Gibson et al. | |
| 6,731,600 B1 | 5/2004 | Patel et al. | |
| 6,732,183 B1 | 5/2004 | Graham | |
| 6,760,772 B2 | 7/2004 | Zou et al. | |
| 6,792,449 B2 | 9/2004 | Colville et al. | |
| 6,795,863 B1 | 9/2004 | Doty, Jr. | |
| 6,801,947 B1 | 10/2004 | Li | |
| 6,845,107 B1 | 1/2005 | Kitazawa et al. | |
| 6,850,965 B2 | 2/2005 | Allen | |
| 6,859,839 B1 | 2/2005 | Zahorjan et al. | |
| 6,874,015 B2 | 3/2005 | Kaminsky et al. | |
| 6,885,471 B1 | 4/2005 | Minowa et al. | |
| 6,968,387 B2 | 11/2005 | Lanphear | |
| 6,976,090 B2 | 12/2005 | Ben-Shaul et al. | |
| 7,031,700 B1 | 4/2006 | Weaver et al. | |
| 7,046,805 B2 | 5/2006 | Fitzhardinge et al. | |
| 7,054,365 B2 | 5/2006 | Kim et al. | |
| 7,054,774 B2 | 5/2006 | Batterberry et al. | |
| 7,054,911 B1 | 5/2006 | Lango et al. | |
| 7,075,986 B2 | 7/2006 | Girod et al. | |
| 7,093,001 B2 | 8/2006 | Yang et al. | |
| 7,096,271 B1 | 8/2006 | Omoigui et al. | |
| 7,099,954 B2 | 8/2006 | Li et al. | |
| 7,111,044 B2 | 9/2006 | Lee | |
| 7,116,894 B1 | 10/2006 | Chatterton | |
| 7,124,164 B1 | 10/2006 | Chemtob | |
| 7,174,385 B2 | 2/2007 | Li | |
| 7,176,957 B2 | 2/2007 | Ivashin et al. | |
| 7,177,642 B2 | 2/2007 | Sanchez Herrero et al. | |
| 7,190,670 B2 | 3/2007 | Varsa et al. | |
| 7,194,549 B1 | 3/2007 | Lee et al. | |
| 7,240,100 B1 | 7/2007 | Wein et al. | |
| 7,260,640 B1 | 8/2007 | Kramer et al. | |
| 7,274,740 B2 | 9/2007 | van Beek et al. | |
| 7,295,520 B2 | 11/2007 | Lee et al. | |
| 7,310,678 B2 | 12/2007 | Gunaseelan et al. | |
| 7,313,236 B2 | 12/2007 | Amini et al. | |
| 7,325,073 B2 | 1/2008 | Shao et al. | |
| 7,328,243 B2 | 2/2008 | Yeager et al. | |
| 7,330,908 B2 | 2/2008 | Jungck | |
| 7,334,044 B1 | 2/2008 | Allen | |
| 7,349,358 B2 | 3/2008 | Hennessey et al. | |
| 7,349,976 B1 | 3/2008 | Glaser et al. | |
| 7,369,610 B2 | 5/2008 | Xu et al. | |
| 7,376,747 B2 | 5/2008 | Hartop | |
| 7,391,717 B2 | 6/2008 | Klemets et al. | |
| 7,408,984 B2 | 8/2008 | Lu et al. | |
| 7,412,531 B1 | 8/2008 | Lango et al. | |
| 7,477,688 B1 | 1/2009 | Zhang et al. | |
| 7,523,181 B2 | 4/2009 | Swildens et al. | |
| 7,529,541 B2 | 5/2009 | Cho et al. | |
| 7,536,469 B2 | 5/2009 | Chou et al. | |
| 7,546,355 B2 | 6/2009 | Kalnitsky | |
| 7,555,464 B2 | 6/2009 | Candelore | |
| 7,558,472 B2 | 7/2009 | Locket et al. | |
| 7,558,869 B2 * | 7/2009 | Leon ................. H04L 29/06027 370/235 | |
| 7,577,750 B2 | 8/2009 | Shen et al. | |
| 7,593,333 B2 | 9/2009 | Li et al. | |
| 7,599,307 B2 | 10/2009 | Seckin et al. | |
| 7,609,652 B2 | 10/2009 | Kellerer et al. | |
| 7,631,039 B2 | 12/2009 | Eisenberg | |
| 7,653,735 B2 | 1/2010 | Mandato et al. | |
| 7,657,644 B1 | 2/2010 | Zheng | |
| 7,660,906 B1 | 2/2010 | Armour | |
| 7,707,303 B2 * | 4/2010 | Albers ................. H04L 1/1835 709/231 | |
| 7,719,985 B2 | 5/2010 | Lee et al. | |
| 7,733,830 B2 | 6/2010 | Curcio et al. | |
| 7,760,801 B2 | 7/2010 | Ghanbari et al. | |
| 7,761,609 B1 | 7/2010 | Srinivasan et al. | |
| 7,779,135 B2 | 8/2010 | Hudson et al. | |
| 7,788,395 B2 | 8/2010 | Bowra et al. | |
| 7,797,439 B2 | 9/2010 | Cherkasova et al. | |
| 7,817,985 B2 | 10/2010 | Moon | |
| 7,818,444 B2 | 10/2010 | Brueck et al. | |
| 7,873,040 B2 | 1/2011 | Karlsgodt | |
| 8,036,265 B1 | 10/2011 | Reynolds et al. | |
| 8,135,852 B2 | 3/2012 | Nilsson et al. | |
| 8,209,429 B2 | 6/2012 | Jacobs et al. | |
| 8,370,514 B2 | 2/2013 | Hurst et al. | |
| 8,402,156 B2 | 3/2013 | Brueck et al. | |
| 8,612,624 B2 | 12/2013 | Frueck et al. | |
| 8,683,066 B2 | 3/2014 | Hurst et al. | |
| 8,880,721 B2 | 11/2014 | Hurst et al. | |
| 2001/0013128 A1 | 8/2001 | Hagai et al. | |
| 2001/0047423 A1 | 11/2001 | Shao et al. | |
| 2002/0073167 A1 | 6/2002 | Powell et al. | |
| 2002/0087634 A1 | 7/2002 | Ogle et al. | |
| 2002/0091840 A1 | 7/2002 | Pulier et al. | |
| 2002/0097750 A1 | 7/2002 | Gunaseelan et al. | |
| 2002/0118809 A1 | 8/2002 | Eisenberg | |
| 2002/0122491 A1 | 9/2002 | Karczewicz et al. | |
| 2002/0131496 A1 | 9/2002 | Vasudevan et al. | |
| 2002/0133547 A1 | 9/2002 | Lin | |
| 2002/0136406 A1 | 9/2002 | Fitzhardinge et al. | |
| 2002/0138619 A1 | 9/2002 | Ramaley et al. | |
| 2002/0144276 A1 | 10/2002 | Radford et al. | |
| 2002/0146102 A1 | 10/2002 | Lang | |
| 2002/0152317 A1 | 10/2002 | Wang et al. | |
| 2002/0152318 A1 | 10/2002 | Menon et al. | |
| 2002/0161898 A1 | 10/2002 | Hartop et al. | |
| 2002/0161908 A1 * | 10/2002 | Benitez ....................... G06F 8/65 709/231 | |
| 2002/0161911 A1 | 10/2002 | Pinckney, III et al. | |
| 2002/0169926 A1 | 11/2002 | Pinckney, III et al. | |
| 2002/0174434 A1 | 11/2002 | Lee et al. | |
| 2002/0176418 A1 | 11/2002 | Hunt et al. | |
| 2002/0178138 A1 | 11/2002 | Ender et al. | |
| 2002/0178330 A1 | 11/2002 | Schlowsky-Fischer et al. | |
| 2002/0184391 A1 | 12/2002 | Phillips | |
| 2002/0188745 A1 * | 12/2002 | Hughes ............. H04L 29/06027 709/231 | |

(56) References Cited

U.S. PATENT DOCUMENTS

| | | |
|---|---|---|
| 2002/0194608 A1 | 12/2002 | Goldhor |
| 2003/0005455 A1 | 1/2003 | Bowers |
| 2003/0007464 A1 | 1/2003 | Balani |
| 2003/0014684 A1 | 1/2003 | Kashyap |
| 2003/0018966 A1 | 1/2003 | Cook et al. |
| 2003/0021166 A1 | 1/2003 | Soloff |
| 2003/0021282 A1* | 1/2003 | Hospodor ............ H04L 12/5695 370/401 |
| 2003/0037103 A1 | 2/2003 | Salmi et al. |
| 2003/0065803 A1 | 4/2003 | Heuvelman |
| 2003/0067872 A1 | 4/2003 | Harrell et al. |
| 2003/0078972 A1 | 4/2003 | Tapissier et al. |
| 2003/0081582 A1 | 5/2003 | Jain et al. |
| 2003/0093790 A1 | 5/2003 | Logan et al. |
| 2003/0107994 A1 | 6/2003 | Jacobs et al. |
| 2003/0135631 A1 | 7/2003 | Li et al. |
| 2003/0140159 A1 | 7/2003 | Campbell et al. |
| 2003/0151753 A1 | 8/2003 | Li et al. ............................ 358/1.9 |
| 2003/0152036 A1 | 8/2003 | Quigg Brown et al. |
| 2003/0154239 A1 | 8/2003 | Davis et al. |
| 2003/0195977 A1* | 10/2003 | Liu ................... H04L 29/06027 709/231 |
| 2003/0204519 A1 | 10/2003 | Sirivara et al. |
| 2003/0204602 A1 | 10/2003 | Hudson et al. |
| 2003/0220972 A1 | 11/2003 | Montet et al. |
| 2004/0003101 A1 | 1/2004 | Roth et al. |
| 2004/0010613 A1 | 1/2004 | Apostolopoulos et al. |
| 2004/0030547 A1 | 2/2004 | Leaning et al. |
| 2004/0030599 A1 | 2/2004 | Sie et al. |
| 2004/0030797 A1 | 2/2004 | Akinlar et al. |
| 2004/0031054 A1 | 2/2004 | Dankworth et al. |
| 2004/0049780 A1 | 3/2004 | Gee |
| 2004/0054551 A1 | 3/2004 | Ausubel et al. |
| 2004/0071209 A1 | 4/2004 | Burg et al. |
| 2004/0083283 A1 | 4/2004 | Sundaram et al. |
| 2004/0093420 A1 | 5/2004 | Gamble |
| 2004/0098748 A1 | 5/2004 | Bo et al. |
| 2004/0103444 A1 | 5/2004 | Weinberg et al. |
| 2004/0117427 A1 | 6/2004 | Allen et al. |
| 2004/0143672 A1 | 7/2004 | Padmanabham et al. |
| 2004/0153458 A1 | 8/2004 | Noble et al. |
| 2004/0168052 A1 | 8/2004 | Clisham et al. |
| 2004/0170392 A1 | 9/2004 | Lu et al. |
| 2004/0179032 A1* | 9/2004 | Huang ................... H04N 19/61 715/723 |
| 2004/0199655 A1* | 10/2004 | Davies ................... H04L 47/10 709/231 |
| 2004/0220926 A1 | 11/2004 | Lamkin et al. |
| 2004/0221088 A1* | 11/2004 | Lisitsa .............. H04L 29/06027 710/316 |
| 2004/0260701 A1 | 12/2004 | Lehikoinen et al. |
| 2004/0267956 A1* | 12/2004 | Leon ................... H04L 12/5602 709/231 |
| 2005/0009520 A1 | 1/2005 | Herrero et al. |
| 2005/0015509 A1 | 1/2005 | Sitaraman |
| 2005/0024487 A1 | 2/2005 | Chen |
| 2005/0033855 A1 | 2/2005 | Moradi et al. |
| 2005/0050152 A1 | 3/2005 | Penner et al. |
| 2005/0055425 A1 | 3/2005 | Lango et al. |
| 2005/0066063 A1 | 3/2005 | Grigorovitch et al. |
| 2005/0076136 A1 | 4/2005 | Cho et al. |
| 2005/0084166 A1 | 4/2005 | Bonch et al. |
| 2005/0108414 A1 | 5/2005 | Taylor et al. ................... 709/231 |
| 2005/0120107 A1 | 6/2005 | Kagan et al. |
| 2005/0123058 A1 | 6/2005 | Greenbaum et al. |
| 2005/0185578 A1 | 8/2005 | Padmanabhan et al. |
| 2005/0188051 A1 | 8/2005 | Sneh |
| 2005/0204046 A1 | 9/2005 | Watanabe |
| 2005/0204385 A1 | 9/2005 | Sull et al. |
| 2005/0223087 A1 | 10/2005 | Van Der Stok |
| 2005/0251832 A1 | 11/2005 | Chiueh |
| 2005/0254508 A1 | 11/2005 | Aksu et al. |
| 2005/0262257 A1 | 11/2005 | Major et al. |
| 2006/0010003 A1 | 1/2006 | Kruse |
| 2006/0047779 A1 | 3/2006 | Deshpande |
| 2006/0059223 A1 | 3/2006 | Klemets et al. |
| 2006/0080718 A1 | 4/2006 | Gray et al. |
| 2006/0130118 A1 | 6/2006 | Damm |
| 2006/0133809 A1 | 6/2006 | Chow et al. |
| 2006/0165166 A1 | 7/2006 | Chou et al. |
| 2006/0168290 A1 | 7/2006 | Doron |
| 2006/0168295 A1 | 7/2006 | Batterberry et al. |
| 2006/0184688 A1 | 8/2006 | Ganguly et al. |
| 2006/0206246 A1 | 9/2006 | Walker |
| 2006/0218264 A1 | 9/2006 | Ogawa et al. |
| 2006/0236219 A1 | 10/2006 | Grigorovitch et al. |
| 2006/0242315 A1 | 10/2006 | Nichols |
| 2006/0270404 A1 | 11/2006 | Tuohino et al. |
| 2006/0277564 A1 | 12/2006 | Jarman |
| 2006/0282540 A1 | 12/2006 | Tanimoto |
| 2006/0288099 A1 | 12/2006 | Jefferson et al. |
| 2007/0024705 A1 | 2/2007 | Richter et al. |
| 2007/0030833 A1 | 2/2007 | Pirzada et al. |
| 2007/0037599 A1 | 2/2007 | Tillet et al. |
| 2007/0067480 A1 | 3/2007 | Beek et al. |
| 2007/0078768 A1 | 4/2007 | Dawson |
| 2007/0079325 A1 | 4/2007 | de Heer |
| 2007/0094405 A1 | 4/2007 | Zhang |
| 2007/0204310 A1 | 8/2007 | Hua et al. |
| 2007/0280255 A1 | 12/2007 | Tsang et al. |
| 2008/0028428 A1 | 1/2008 | Jeong et al. |
| 2008/0037527 A1 | 2/2008 | Chan et al. |
| 2008/0046939 A1 | 2/2008 | Lu et al. |
| 2008/0056373 A1 | 3/2008 | Newlin et al. |
| 2008/0060029 A1 | 3/2008 | Park et al. |
| 2008/0091838 A1 | 4/2008 | Miceli |
| 2008/0133766 A1 | 6/2008 | Luo |
| 2008/0162713 A1 | 7/2008 | Bowra et al. |
| 2008/0195744 A1 | 8/2008 | Bowra et al. |
| 2008/0195745 A1 | 8/2008 | Bowra et al. |
| 2008/0205291 A1 | 8/2008 | Li et al. |
| 2008/0219151 A1 | 9/2008 | Ma et al. |
| 2008/0263180 A1 | 10/2008 | Hurst et al. |
| 2008/0281803 A1 | 11/2008 | Gentric |
| 2009/0006538 A1 | 1/2009 | Risney, Jr. et al. |
| 2009/0049186 A1 | 2/2009 | Agnihotri et al. |
| 2009/0055417 A1 | 2/2009 | Hannuksela |
| 2009/0055471 A1 | 2/2009 | Kozat et al. |
| 2009/0055547 A1 | 2/2009 | Hudson et al. |
| 2009/0132599 A1 | 5/2009 | Soroushian et al. |
| 2009/0132721 A1 | 5/2009 | Soroushian et al. |
| 2009/0210549 A1 | 8/2009 | Hudson et al. |
| 2010/0098103 A1 | 4/2010 | Xiong et al. |
| 2010/0158101 A1 | 6/2010 | Wu et al. |
| 2010/0262711 A1 | 10/2010 | Bouazizi |
| 2014/0207966 A1 | 7/2014 | Hurst et al. |
| 2015/0058496 A1 | 2/2015 | Hurst et al. |

FOREIGN PATENT DOCUMENTS

| | | |
|---|---|---|
| EP | 0 919 952 A1 | 6/1999 |
| EP | 1202487 A2 | 10/2001 |
| EP | 1395014 A1 | 8/2002 |
| EP | 1298931 A2 | 2/2003 |
| EP | 1298931 A2 | 4/2003 |
| EP | 1 641 271 A2 | 3/2006 |
| EP | 1 670 256 A2 | 6/2006 |
| EP | 1 777 969 A1 | 4/2007 |
| GB | 2367219 A | 9/2000 |
| JP | 2000201343 A | 7/2000 |
| JP | 200192752 | 4/2001 |
| JP | 2004054930 | 2/2004 |
| JP | 2011004225 A | 1/2011 |

(56) References Cited

FOREIGN PATENT DOCUMENTS

| WO | WO 00/67469 | 11/2000 |
|---|---|---|
| WO | 0167264 A1 | 9/2001 |
| WO | 03003760 A2 | 1/2003 |
| WO | 03009581 A1 | 1/2003 |
| WO | 03027876 A1 | 4/2003 |
| WO | 2004025405 A2 | 3/2004 |
| WO | 2004036824 A1 | 4/2004 |
| WO | 2006010113 A2 | 1/2006 |

OTHER PUBLICATIONS

U.S. Patent and Trademark Office, Non-Final Office Action, dated Oct. 24, 2014 for U.S. Appl. No. 14/222,245.
USPTO, Notice of Allowance and Fee(s) Due for U.S. Appl. No. 14/106,051 mailed Feb. 24, 2015.
USPTO, Final Office Action for U.S. Appl. No. 14/222,245 mailed Mar. 18, 2015.
Canadian Intellectual Property Office, Office Action, dated Sep. 10, 2014 for Canadian Application No. 2564861.
USPTO "International Search Report" mailed Dec. 12, 2008; International Appln. No. PCT/US2008/061035, filed Apr. 21, 2008.
Australian Government "Examiner's First Report" dated Oct. 17, 2011; Australian Patent Appln. No. 2011213730.
Korean Intellectual Property Office "Official Notice of Preliminary Rejection" issued Jul. 28, 2011; Korean Patent Appln. No. 10-2006-7025274.
Japan Patent Office "Notice of Rejection Ground" mailed Apr. 26, 2011; Japanese Patent Appln. No. 2007-511070.
Fujisawa, Hiroshi et al. "Implementation of Efficient Access Mechanism for Multiple Mirror-Servers" IPSJ SIG Technical Report, vol. 2004, No. 9, Jan. 30, 2004, Information Processing Society of Japan, pp. 37-42.
Liu, Jiangchuan et al. "Opportunities and Challenged of Peer-to-Peer Internet Video Broadcast," School of Computing Science, Simon Fraser University, British Columbia, Canada.
USPTO International Searching Authority "International Search Report and Written Opinion," mailed Nov. 5, 2008; International Appln. No. PCT/US2008/009281, filed Aug. 1, 2008.
Zhang, Xinyan et al. "CoolStreaming/DONet: A Data-Driven Overlay Network for Peer-to-Peer Live Media Streaming" IEEE 2005.
Guo, Yang "DirectStream: A Directory-Based Peer-To-Peer Video Streaming Service" LexisNexis, Elsevier B.V. 2007.
Liu, Jiangchuan et al. "Adaptive Video Multicast Over the Internet" IEEE Computer Society, 2003.
Rejaie, Reza et al. "Architectural Considerations for Playback of Quality Adaptive Video Over the Internet" University of Southern California, Information Sciences Institute, 1998.)
Roy, Sumit et al. "A System Architecture for Managing Mobile Streaming Media Services" Streaming Media Systems Group, Hewlett-Packard Laboratories, 2003.
Xu, Dongyan et al. "On Peer-to-Peer Media Streaming" Department of Computer Sciences, Purdue University, 2002.
Kozamernik, Franc "Media Streaming Over the Internet—An Over of Delivery Technologies" EBU Technical Review, Oct. 2002.
Lienhart, Rainer et al. "Challenges in Distributed Video Management and Delivery" Intel Corporation, EECS Dept., UC Berkeley, 2000-2002.
Japan Patent Office "Final Office Action" mailed Feb. 28, 2012 in Patent Application No. 2007-511070 filed on Oct. 26, 2006.
Japan Patent Office "Interrogation" mailed Nov. 6, 2012 in Patent Application No. 2007-511070 filed on Oct. 26, 2006.
Canadian Intellectual Property Office "Office Action" mailed Sep. 9, 2013 in Patent Application No. 2,564,861 filed on Oct. 30, 2006.
USPTO "Office Action" mailed Sep. 13, 2013 in U.S. Appl. No. 13/757,571, filed Feb. 1, 2013.
USPTO "Notice of Allowance" mailed Jun. 24, 2014 in U.S. Appl. No. 13/757,571, filed Feb. 1, 2013.
European Patent Office "Extended Search Report" dated Jul. 10, 2014 in Patent Application No. 12154559.4 filed on Sep. 20, 2002.
Nguyen, Thinh, "Multiple Sender Distributed Video Streaming" in IEEE Transactions on Multimedia, vol. 6, No. 2, Published Apr. 2, 2004.
Weblio, The Meaning of Performance Factor—English-Japanese Weblio Dictionary, [online], Feb. 24, 2012; retrieved from the internet—URL:http://ejje, weblio.jp/content/performance+factor.
Masato Tsuru et al., Recent Evolution of the Internet Measurement and Inference Techniques, IEICE Technical Report, vol. 103, No. 123 (IN2003-16 to 23), IEICE, Jun. 12, 2003, pp. 37 to 42, ISSN: 0913-05685.
Takeshi Yoshimura et al., Mobile Streaming Media CDN Enabled by Dynamic SMIL, WWW2002, May 7-11, 2002; retrieved from the Internet at http://www2002.org/CDROM/refereed/515/.
Canadian Intellectual Property Office, Office Action, mailed Oct. 15, 2012 for Patent Application No. 2,564,861.
Clement, B., Move Networks Closes $11.3 Million on First Round VC Funding, Page One PR, Move Networks, Inc. Press Releases, Feb. 7, 2007, http://www.move.tv/press/press20070201.html.
Move Networks, Inc., The Next Generation Video Publishing System, Apr. 11, 2007; http://www.movenetworks.com/wp-content/uploads/move-networks-publishing-system.pdf.
U.S. Patent and Trademark Office, Non-Final Office Action, dated Aug. 7, 2014 for U.S. Appl. No. 14/106,051.
Final Office Action for U.S. Appl. No. 11/673,483, Feb. 4, 2010, 21 pages.
Advisory Action for U.S. Appl. No. 11/673,483, Apr. 9, 2010, 3 pages.
Advisory Action for U.S. Appl. No. 11/673,483, May 26, 2010, 3 pages.
Notice of Allowance for U.S. Appl. No. 11/673,483, Aug. 5, 2010, 7 pages.
Wicker, Stephen B., "Error Control Systems for Digital Communication and Storage", Prentice-Hall, Inc., New Jersey, USA, 1995 (Book: see NPL's Parts 1-6).
PCT Notification of Transmittal of the International Search Report and Written Opinion of the International Searching Authority, for PCT/US05/15091, Oct. 29, 2007, 8 pages.
PCT Notification of Transmittal of International Preliminary Report on Patentability, for PCT/US05/15091, Oct. 29, 2007, 6 pages.
Office Action for U.S. Appl. No. 11/673,483, Jul. 9, 2009, 14 pages.
Office Action for U.S. Appl. No. 11/673,483, Feb. 3, 2009, 9 pages.
Albanese, Andres, et al. "Priority Encoding Transmission", TR-94-039, Aug. 1994, 36 pages, International Computer Science Institute, Berkeley, California.
Puri, Rohit, et al. "Multiple Description Source Coding Using Forward Error Correction Codes", Oct. 1999, 5 pages, Department of Electrical Engineering and Computer Science, University of California, Berkeley, California.
Goyal, Vivek K., "Multiple Description Coding: Compression Meets the Network", Sep. 2001, pp. 74-93, IEEE Signal Processing Magazine.
Supplemental European Search Report, Sep. 30, 2008, (3 pages).
Pathan, Al-Mukaddim, et al., "A Taxonomy and Survey of Content Delivery Networks", Australia, Feb. 2007. Available at http://gridbus.org/reports/CDN-Taxonomy.pdf.
On2 Technologies, Inc., "TrueMotion VP7 Video Codec", White Paper, Document Version 1.0, Jan. 10, 2005, (13 pages).
USPTO, Office Action for U.S. Appl. No. 14/531,804, mailed May 11, 2015.

* cited by examiner

APPARATUS, SYSTEM, AND METHOD FOR ADAPTIVE-RATE SHIFTING OF STREAMING CONTENT

CROSS-REFERENCES TO RELATED APPLICATIONS

This application claims benefit of U.S. Provisional Patent Application No. 60/566,831 entitled "APPARATUS, SYSTEM, AND METHOD FOR DYNAMIC RATE SHIFTING OF STREAMING CONTENT" and filed on Apr. 30, 2004 for R. Drew Major and Mark B. Hurst, which is incorporated herein by reference.

BACKGROUND OF THE INVENTION

1. Field of the Invention

The invention relates to video streaming over packet switched networks such as the Internet, and more particularly relates to adaptive-rate shifting of streaming content over such networks.

2. Description of the Related Art

The Internet is last becoming a preferred method for distributing media files to end users. It is currently possible to download music or video to computers, cell phones, or practically any network capable device. Many portable media players are equipped with network connections and enabled to play music or videos. The music or video files (hereinafter "media files") can be stored locally on the media player or computer, or streamed or downloaded from a server.

"Streaming media" refers to technology that delivers content at a rate sufficient for presenting the media to a user in real time as the data is received. The data may be stored in memory temporarily until played and then subsequently deleted. The user has the immediate satisfaction of viewing the requested content without wading for the media file to completely download. Unfortunately, the audio/video quality that can be received for real time presentation is constrained by the available bandwidth of the user's network connection. Streaming may be used to deliver content on demand (previously recorded) or from live broadcasts.

Alternatively, media files may be downloaded and stored on persistent storage devices, such as hard drives or optical storage, for later presentation. Downloading complete media files can take large amounts of time depending on the network connection. Once downloaded, however, the content can be viewed repeatedly anytime or anywhere. Media files prepared for downloading usually are encoded with a higher quality audio/video than can be delivered in real time. Users generally dislike this option, as they tend to want to see or hear the media file instantaneously.

Streaming offers the advantage of immediate access to the content but currently sacrifices quality compared with downloading a file of the same content. Streaming also provides the opportunity for a user to select different content for viewing on an ad hoc basis, while downloading is by definition restricted to receiving a specific content selection in its entirety or not at all. Downloading also supports rewind, fast forward, and direct seek operations, while streaming is unable to fully support these functions. Streaming is also vulnerable to network failures or congestion.

Another technology, known as "progressive downloads," attempts to combine the strengths of the above two technologies. When a progressive download is initiated, the media file download begins, and the media player waits to begin playback until there is enough of the file downloaded that playback can begin with the hope that the remainder of the file will be completely downloaded before playback "catches up." This waiting period before playback can be substantial depending on network conditions, and therefore is not a complete or fully acceptable solution to the problem of media presentation over a network.

Generally, three basic challenges exist with regard to data transport streaming over a network such as the Internet that has a varying amount of data loss. The first challenge is reliability. Most streaming solutions use a TCP connection, or "virtual circuit," for transmitting data. A TCP connection provides a guaranteed delivery mechanism so that data sent from one endpoint will be delivered to the destination, even if portions are lost and retransmitted. A break in the continuity of a TCP connection can have serious consequences when the data must be delivered in real-time. When a network adapter detects delays or losses in a TCP connection, the adapter "backs off" from transmission attempts for a moment and then slowly resumes the original transmission pace. This behavior is an attempt to alleviate the perceived congestion. Such a slowdown is detrimental, to the viewing or listening experience of the user and therefore is not acceptable.

The second challenge to data transport Is efficiency. Efficiency refers to how well the user's available bandwidth is used for delivery of the content stream. This measure is directly related to the reliability of the TCP connection. When the TCP connection is suffering reliability problems, a loss of bandwidth utilization results. The measure of efficiency sometimes varies suddenly, and can greatly impact the viewing experience.

The third challenge is latency. Latency is the time measure form the client's point-of-view of the interval between when a request is issued and the response data begins to arrive. This value is affected by the network connection's reliability and efficiency, and the processing time required by the origin to prepare the response. A busy or overloaded server, for example, will take more time to process a request. As well as affecting the start time of a particular request, latency has a significant impact on the network throughput of TCP.

From the foregoing discussion, it should be apparent that a need exists for an apparatus, system, and method that alleviate the problems of reliability, efficiency, and latency. Additionally, such an apparatus, system, and method would offer instantaneous viewing along with the ability to fast forward, rewind, direct seek, and browse multiple streams. Beneficially, such an apparatus, system, and method would utilize multiple connections between a source and destination, requesting varying bitrate streams depending upon network conditions.

SUMMARY OF THE INVENTION

The present invention has been developed in response to the present state of the art, and in particular, in response to the problems and needs in the art that have not yet been fully solved by currently available content streaming systems. Accordingly, the present invention has been developed to provide an apparatus, system, and method for adaptive-rate content streaming that overcome many or all of the above-discussed shortcomings in the art.

The apparatus for adaptive-rate content streaming is provided with a logic unit containing a plurality of modules configured to functionally execute the necessary steps. These modules in the described embodiments include an agent controller module configured to simultaneously request a plurality of streamlets, the agent controller module further configured to continuously monitor streamlet requests and subsequent responses, and accordingly request higher or lower quality streamlets, and a staging module configured to stage the streamlets and arrange the streamlets for playback on a content player.

The apparatus is further configured, in one embodiment, to establish multiple Transmission Control Protocol (TCP) connections with a content server, and request streamlets of varying bitrates. Each streamlet may further comprise a portion of a content file. Additionally, the agent controller module may be configured to generate a performance factor according to responses from streamlet requests.

In a further embodiment, the agent controller module is configured to upshift to a higher quality streamlet when the performance factor is greater than a threshold, and the agent controller module determines the higher quality playback can be sustained according to a combination of factors. The factors may include an amount of contiguously available streamlets stored in the staging module, a minimum safety margin, and a current read, ahead margin.

The agent controller module may be configured to downshift to a lower quality streamlet when the performance factor is less than a second threshold. Also, the agent controller module is further configured to anticipate streamlet requests and pre-request streamlets to enable fast-forward, skip randomly, and rewind functionality. In one embodiment, the agent controller module is configured to initially request low quality streamlets to enable instant playback of the content file, and subsequent upshifting according to the performance factor.

A system of the present invention is also presented to adaptive-rate content streaming. In particular, the system, in one embodiment, includes a data communications network, and a content server coupled to the data communications network and having a content module configured to process content and generate a plurality of high and low quality streams. In one embodiment, each of the high and low quality streams may include a plurality of streamlets.

In a further embodiment, the system also includes an agent controller module configured to simultaneously request a plurality of streamlets, the agent controller module further configured to continuously monitor streamlet requests and subsequent responses, and accordingly request higher or lower quality streamlets, and a staging module configured to stage the streamlets and arrange the streamlets for playback on a content player.

A method of the present invention is also presented for adaptive-rate content streaming. The method in the disclosed embodiments substantially includes the steps necessary to carry out the functions presented above with respect to the operation of the described apparatus and system. In one embodiment, the method includes simultaneously requesting a plurality of streamlets, continuously monitoring streamlet requests and subsequent responses, and accordingly requesting higher or lower quality streamlets, and staging the streamlets and arranging the streamlets for playback on a content player.

In a further embodiment, the method may include establishing multiple Transmission Control Protocol (TCP) connections with a content server, and requesting streamlets of varying nitrates. Also, the method may include generating & performance factor according to responses from streamlet requests, upshifting to a higher quality streamlet when the performance factor is greater than a threshold, and determining if the higher quality playback can be sustained. Furthermore, the method may include downshifting to a lower quality streamlet when the performance factor is less than a second threshold.

In one embodiment, the method includes anticipating streamlet requests and pre-requesting streamlets to enable fast-forward, skip randomly, and rewind functionality. The method may also comprise initially requesting low quality streamlets to enable instant playback of a content file, and subsequent upshifting according to the performance factor.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
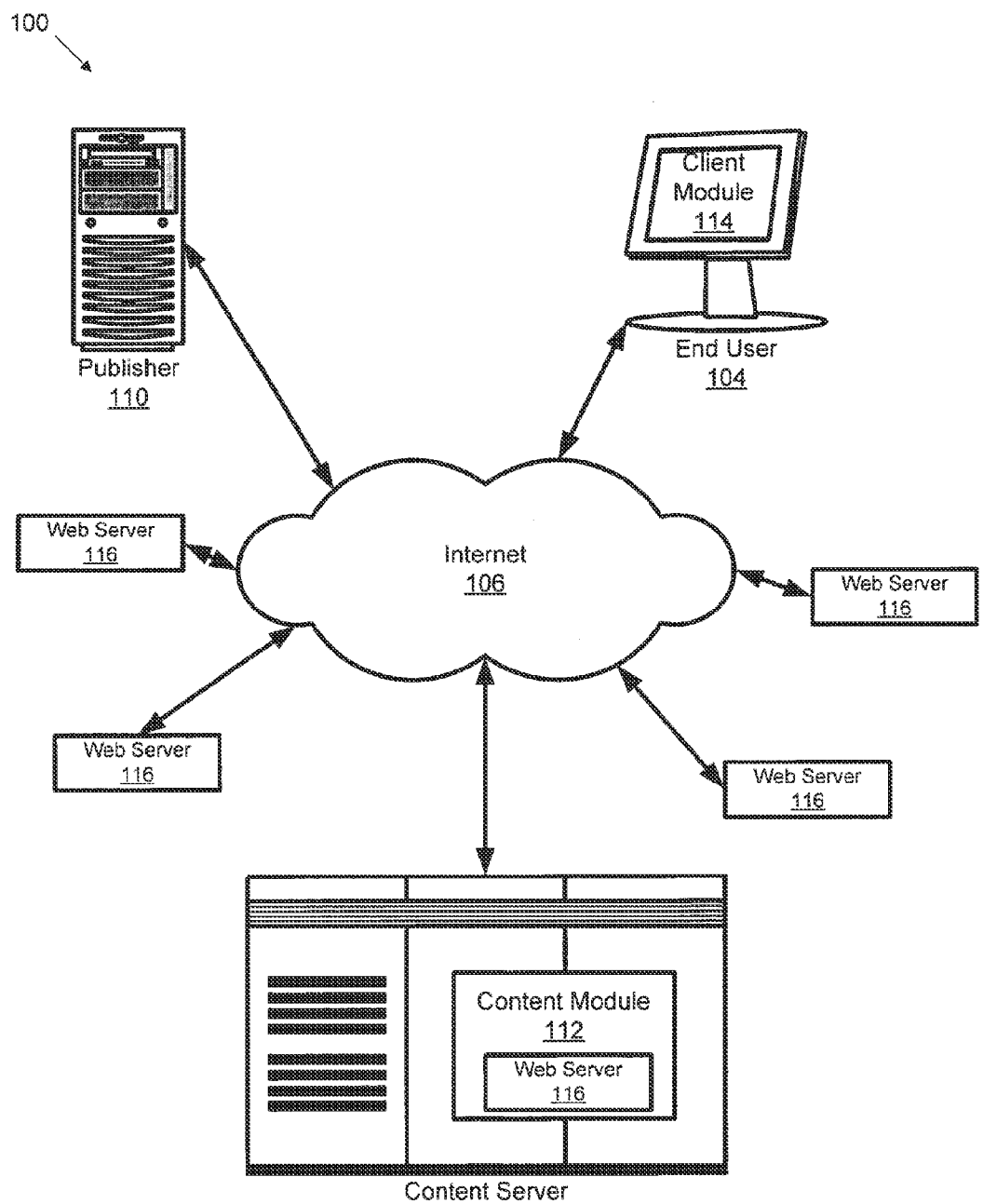
FIG. 1 is a schematic block diagram illustrating one embodiment of a system for adaptive rate shifting of streaming content in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several, memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal hearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a system 100 for dynamic rate shifting of streaming content in accordance with the present invention. In one embodiment, the system 100 comprises a content server 102 and an end user 104. The content server 102 and the end user station 104 may be coupled by a data communications network. The data communications network may include the Internet 106 and connections 108 to the Internet 106. Alternatively, the content server 102 and the end user 104 may be located on a common local area network, wireless area network, cellular network, virtual local area network, or the like. The end user station 104 may comprise a personal computer (PC), an entertainment system configured to communicate over a network, or a portable electronic device configured to present content.

In the depicted embodiment, the system 100 also includes a publisher 110, and a web server 116. The publisher 110 may be a creator or distributor of content. For example, it the content to be streamed were a broadcast of a television program, the publisher may be a television or cable network channel such as NBC®, or MTV®. Content may be transferred over the internet 106 to the content server 102, where the content is received by a content module 112. The content module 112 may fee configured to receive, process, and store content. In one embodiment, processed content is accessed by a client module 114 configured to play the content on the end user station 104. In a further embodiment, the client module 114 is configured to receive different portions of a content stream from a plurality of locations simultaneously. For example, the client module 114 may request and receive content horn any of the plurality of web servers 116.

Figure 2A:
FIG. 2a is a schematic block diagram graphically illustrating one embodiment of a content file in accordance with the present invention.

FIG. 2a is a schematic block diagram graphically illustrating one embodiment of a content file 200. In one embodiment, the content file 200 is distributed by the publisher 110. The content file 200 may comprise a television broadcast, sports event, movie, music, concert, etc. The content file 200 may also be live or archived content. The content file 200 may comprise uncompressed video and audio, or alternatively, video or audio. Additionally, the content file 200 may be compressed. Examples of a compressed content file 200 include, but are not limited to, DivX®, Windows Media Video 98®, Quicklime 6.5 Sorenson 3®, or Quicklime 6.5/MPEG-4® encoded content.

Figure 2B:
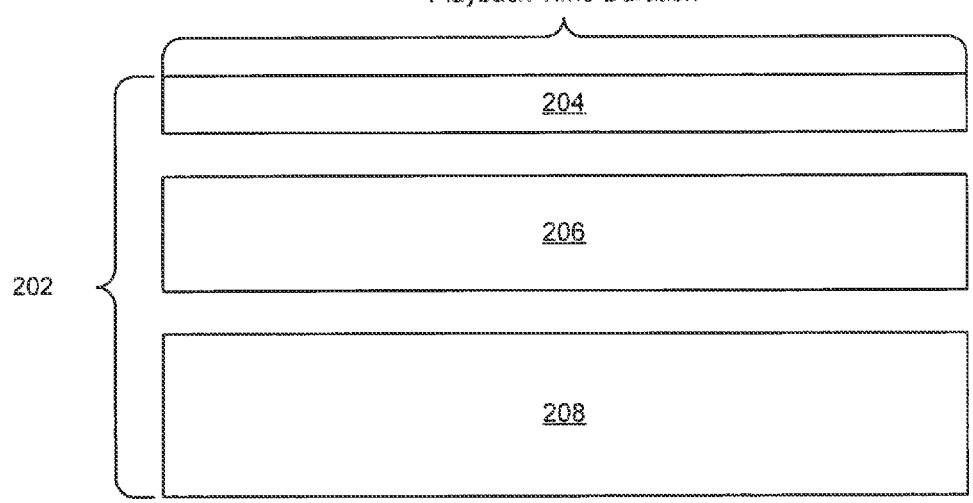
FIG. 2b is a schematic block diagram illustrating one embodiment of a plurality of streams having varying degrees of quality and bandwidth in accordance with the present invention.

FIG. 2b is a schematic block diagram illustrating one embodiment of a plurality of streams 202 having varying degrees of quality and bandwidth. In one embodiment, the plurality of streams 202 comprises a low quality stream 204, a medium quality stream 206, and a high quality stream 208. Each of the streams 204, 206, 208 is a copy of the content file 200 encoded and compressed to varying bit rates. For example, the low quality stream 204 may be encoded and compressed to a bit rate of 100 kilobits per second (kbps), the medium quality stream 206 may be encoded and compressed to a bit rate of 200 kbps, and the high quality stream 208 may be encoded and compressed to 600 kbps.

Figure 2C:
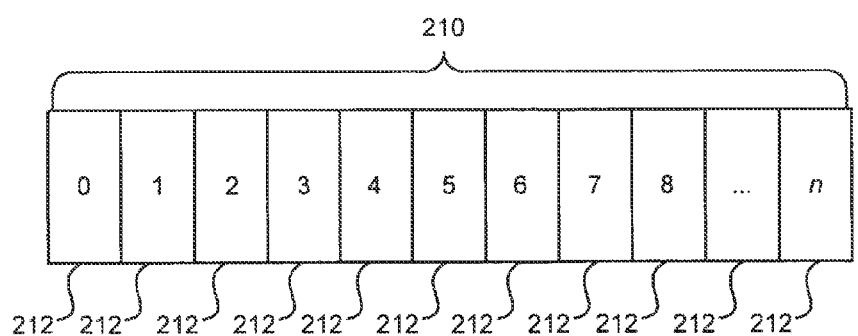
FIG. 2c is a schematic block diagram illustrating one embodiment of a stream divided into a plurality of streamlets in accordance with the present invention.

FIG. 2c is a schematic block diagram illustrating one embodiment of a stream 210 divided into a plurality of streamlets 212. As used herein, streamlet refers to any sized portion of the content file 200. Each streamlet 212 may comprise a portion of the content contained in stream 210, encapsulated as an independent media object. The content in a streamlet 212 may have a unique time index in relation to the beginning of the content contained in stream 210. In one embodiment, the content contained in each streamlet 212 has a duration of two seconds. For example, streamlet 0 may have a time index of 00:00 representing the beginning of content playback, and streamlet 1 may have a time index of 00:02, and so on. Alternatively, the time duration of the streamlets 212 may be any duration smaller than the entire playback duration of the content in stream 210. In a further embodiment, the streamlets 212 may be divided according to file size instead of a time index.

Figure 3:
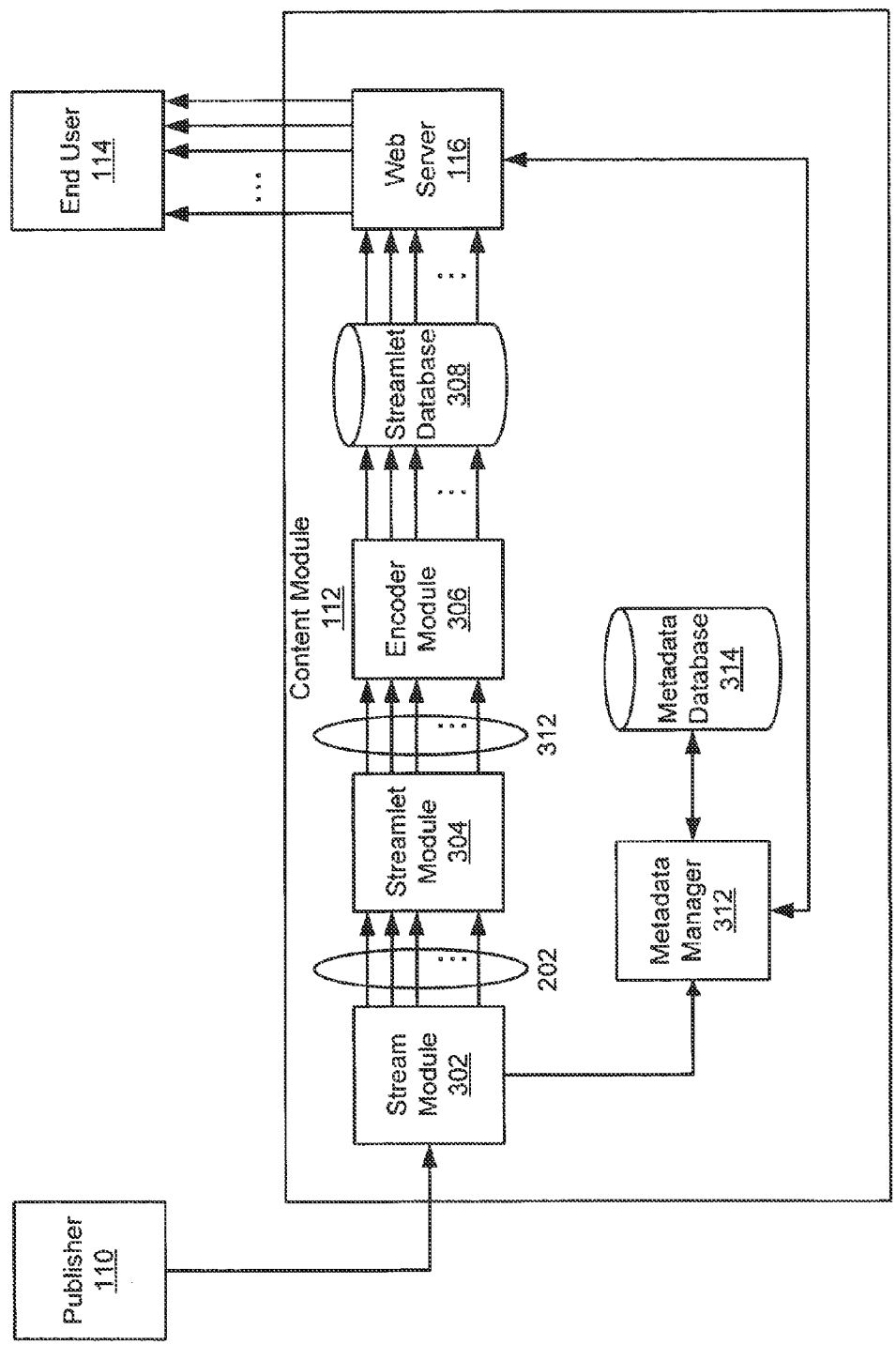
FIG. 3 is a schematic block diagram illustrating one embodiment of a content module in accordance with die present invention.

FIG. 3 is a schematic block diagram illustrating in greater detail one embodiment of the content module 112 in accordance with the present invention. The content module 112 may comprise a stream module 302, a streamlet module 304, an encoder module 306, a streamlet database 308, and the web server 116. In one embodiment, the stream module 302 is configured to receive the content file 200 from the publisher 110 and generate the plurality of streams 202 of varying qualities. The original content file 200 from the publisher may be digital in form and may comprise content having a high bit rate such as, for example, 2 mbps. The content may be transferred from the publisher 110 to the content module 112 over the Internet 106. Such transfers of data are well known in the art and do not require further discussion herein. Alternatively, the content may comprise a captured broadcast.

In the depicted embodiment, the plurality of streams 202 may comprise the low quality stream 204, the medium quality stream 206, and the high quality stream 208. Alternatively, the plurality of streams 202 may comprise any number of streams deemed necessary to accommodate end user bandwidth. The streamlet module 304 may be configured to receive the plurality of streams 202 from the stream module and generate a plurality of streams 312, each stream comprising a plurality of streamlets 212. As described with reference to FIG. 2c, each streamlet 212 may comprise a pre-defined portion of the stream. The encoder module 306 is configured to encode each streamlet from the plurality of streams 312 and store the streamlets in the streamlet database 308. The encoding module 306 may utilize encoding schemes such as DivX®, Windows Media Video 9®, Quicklime 6.5 Sorenson 3®, or Quicklime 6.5/MPEG-4®. Alternatively, a custom encoding scheme may be employed.

The content module 112 may also include a metadata module 312 and a metadata database 314. In one embodiment, metadata comprises static searchable content information. For example, metadata includes, but is not limited to, air date of the content, title, actresses, actors, length, and episode name. Metadata is generated by the publisher 110, and may be configured to define an end user environment. In one embodiment, the publisher 100 may define an end user navigational environment for the content including menus, thumbnails, sidebars, advertising, etc. Additionally, the publisher 110 may define functions such as fast forward, rewind, cause, and play that may be used with the content file 200. The metadata module 312 is configured to receive the metadata from the publisher 110 and store the metadata in the metadata database 314. In a further embodiment, the metadata module 312 is configured to interface with the client module 114, allowing the client module 114 to search for content based upon at least one of a plurality of metadata criteria. Additionally, metadata may be generated by the content module 112 through automated process(es) or manual definition.

Once the streamlets 212 have been received and processed, the client module 114 may request streamlets 212 using HTTP from the web server 116. Such use of client side initiated requests requires no additional configuration of firewalls. Additionally, since the client module 114 initiates the request, the web server 116 is only required to retrieve and serve the requested streamlet. In a further embodiment, the client module 114 may be configured to retrieve streamlets 212 from a plurality of web servers 310. Each web server 116 may be located in various locations across the Internet 106. The streamlets 212 are essentially static files. As such, no specialized media server or server-side intelligence is required for a client module 114 to retrieve streamlets 212. Streamlets 212 may be served by the web server 116 or cached by cache servers of Internet Service Providers (ISPs), or any other network infrastructure operators, and served by the cache server. Use of cache servers is well known to those skilled in the art, and will not be discussed further herein. Thus, a highly scalable solution is provided that is not hindered by massive amounts of client module 114 requests to the web server 116 at any specific location.

Figure 4:
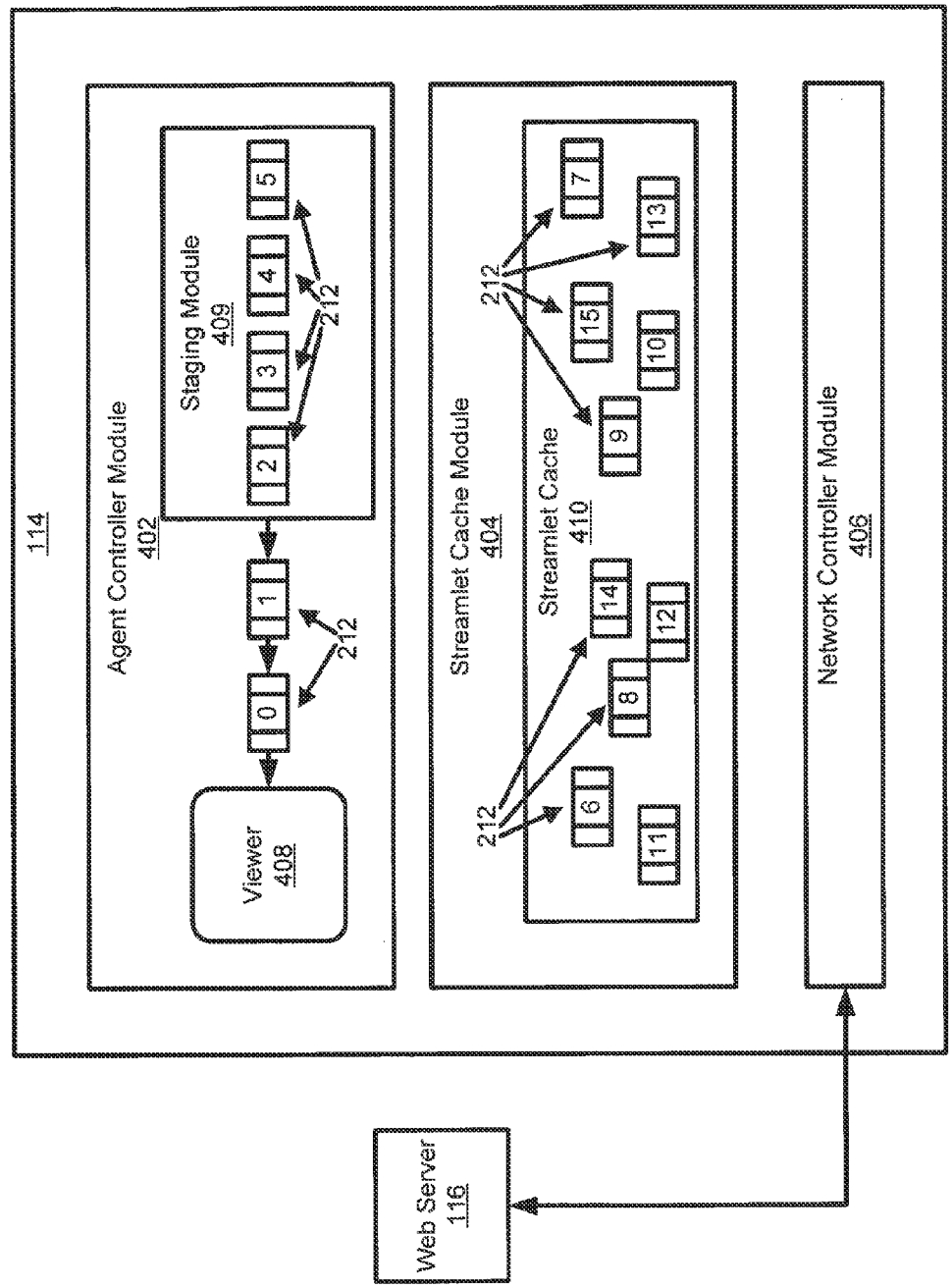
FIG. 4 is a schematic block diagram graphically illustrating one embodiment of a client module in accordance with the present invention.

FIG. 4 is a schematic block diagram graphically illustrating one embodiment of a client module 114 in accordance with the present invention. The client module 114 may comprise an agent controller module 402, a streamlet cache module 404, and a network controller module 406. In one embodiment, the agent controller module 402 is configured to interface with a viewer 408, and transmit streamlets 212 to the viewer 408, In a further embodiment, the client module 114 may comprise a plurality of agent controller modules 402. Each agent controller module 402 may be configured to interface with one viewer 408. Alternatively, the agent controller module 402 may be configured to interface with a plurality of viewers 408. The viewer 408 may be a media player (not shown) operating on a PC or handheld electronic device.

The agent controller module 402 is configured to select a quality level of streamlets to transmit to the viewer 408. The agent controller module 402 requests lower or higher quality streams based upon continuous observation, of time intervals between successive receive times of each requested streamlet. The method of requesting higher or lower quality streams will be discussed in greater detail below with reference to FIG. 7.

The agent controller module 402 may be configured to receive user commands from the viewer 408. Such commands may include play, fast forward, rewind, pause, and stop. In one embodiment, the agent controller module 402 requests streamlets 212 from the streamlet cache module 404 and arranges the received streamlets 212 in a staging module 409. The staging module 409 may fee configured to arrange the streamlets 212 in order of ascending playback time. In the depleted embodiment, the streamlets 212 are numbered 0, 1, 2, 3, 4, etc. However, each streamlet 212 may be identified with a unique filename.

Additionally, the agent controller module 402 may be configured to anticipate streamlet 212 requests and pre-request streamlets 212. By pro-requesting streamlets 212, the user may fast-forward, skip randomly, or rewind through the content and experience no buffering delay. In a further embodiment, the agent controller module 402 may request the streamlets 212 that correspond to time index intervals of 30 seconds within the total play time of the content. Alternatively, the agent controller module 402 may request streamlets at any interval less than the length of the time index. This enables a "fast-start" capability with no buffering wait when starting or fast-forwarding through content file 200. In a further embodiment, the agent controller module 402 may be configured to pre-request streamlets 212 corresponding to specified Index points within the content or within other content in anticipation of the end user 104 selecting new content to view.

In one embodiment, the streamlet cache module 404 is configured to receive streamlet 212 requests from the agent controller module 402. Upon receiving a request, the streamlet cache module 404 first checks a streamlet cache 410 to verify if the streamlet 212 is present. In a further embodiment, the streamlet cache module 404 handles streamlet 212 requests from a plurality of agent controller modules 402. Alternatively, a streamlet cache module 404 may be provided for each agent controller module 402. If the requested streamlet 212 is not present m the streamlet cache 410, the request is passed to the network controller module 406. In order to enable last forward and rewind capabilities, the streamlet cache module 404 is configured to store the plurality of streamlets 212 in the streamlet cache 410 for a specified time period after the streamlet 212 has been viewed. However, once the streamlets 212 have been deleted, they may be requested again from the web server 116.

The network controller module 406 may be configured to receive streamlet requests from the streamlet cache module 404 and open a connection to the web server 116 or other remote streamlet 212 database (not shown). In one embodiment, the network controller module 406 opens a TCP/IP connection to the web server 116 and generates a standard HTTP GET request for the requested streamlet 212. Upon receiving the requested streamlet 212, the network controller module 406 passes the streamlet 212 to the streamlet cache module 404 where it is stored in the streamlet cache 410. In a further embodiment, the network controller module 406 is configured to process and request a plurality of streamlets 212 simultaneously. The network controller module 406 may also be configured to request a plurality of streamlets, where each streamlet 212 is subsequently requested in multiple parts.

In a further embodiment, streamlet requests may comprise requesting pieces of any streamlet file. Splitting the streamlet 212 into smaller pieces or portions beneficially allows for an increased efficiency potential, and also eliminates problems associated with multiple full-streamlet requests sharing the bandwidth at any given moment. This is achieved by using parallel TCP/IP connections for pieces of the streamlets 212. Consequently, efficiency and network loss problems are overcome, and the streamlets arrive with more useful and predictable timing.

In one embodiment, the client module 114 is configured to use multiple TCP connections between the client module 114 and the web server 116 or web cache. The intervention of a cache may be transparent to the client or configured by the client as a forward cache, By requesting more than one streamlet 212 at a time in a manner referred to as "parallel retrieval," or more than one part of a streamlet 212 at a time, efficiency is raised significantly and latency is virtually eliminated. In a further embodiment, the client module allows a maximum of three outstanding streamlet 212 requests. The client module 114 may maintain additional open TCP connections as spares to be available should another connection fail. Streamlet 212 requests are rotated among all open connections to keep the TCP flow logic for any particular connection from falling into a slow-start or close mode. If the network controller module 406 has requested a streamlet 212 in multiple parts, with each part requested on mutually independent TCP/IP connections, the network controller module 406 reassembles the parts to present a complete streamlet 212 for use by all other components of the client module 114.

When a TCP connection fails completely, a new request may be sent on a different connection for the same streamlet 212. In a further embodiment, if a request is not being satisfied in a timely manner, a redundant request may be sent on a different connection for the same streamlet 212, If the first, streamlet request's response arrives before the redundant request response, the redundant request can be aborted. If the redundant request response arrives before the first request response, the first request may be aborted.

Several streamlet 212 requests may be sent on a single TCP connection, and the responses are caused to flow back in matching order along the same connection. This eliminates all but the first request latency. Because multiple responses are always being transmitted, the processing latency of each new streamlet 212 response after the first is not a factor in performance. This technique is known in the industry as "pipelining." Pipelining offers efficiency in request-response processing by eliminating most of the effects of request latency. However, pipelining has serious vulnerabilities. Transmission delays affect all of the responses. If the single TCP connection fails, all of the outstanding requests and responses are lost. Pipelining causes a serial dependency between the requests.

Multiple TCP connections may be opened between the client module 114 and the web server 116 to achieve the latency-reduction efficiency benefits of pipelining while maintaining the independence of each streamlet 212 request. Several streamlet 212 requests may be sent concurrently, with each request being sent on a mutually distinct TCP connection. This technique is labeled "virtual pipelining" and is an innovation of the present invention. Multiple responses may be in transit concurrently, assuring that communication bandwidth between the client module 114 and the web server 116 is always being utilized. Virtual pipelining eliminates the vulnerabilities of traditional pipelining. A delay in or complete failure of one response does not affect the transmission of other responses because each response occupies an independent TCP connection. Any transmission bandwidth not in use by one of multiple responses (whether due to delays or TCP connection failure) may be utilized by other outstanding responses.

A single streamlet 212 request may be issued for an entire streamlet 212, or multiple requests may be issued, each for a different part or portion of the streamlet. If the streamlet is requested in several parts, the parts may be recombined by the client module 114 streamlet.

In order to maintain a proper balance between maximized bandwidth utilization and response time, the issuance of new streamlet requests must be timed such that the web server 116 does not transmit the response before the client module 114 has fully received a response to one of the previously outstanding streamlet requests. For example, if three streamlet 212 requests are outstanding, the client module 114 should issue the next request slightly before one of the three responses is fully received and "out of the pipe." In other words, request timing is adjusted to keep three responses in transit. Sharing of bandwidth among four responses diminishes the net response time of the other three responses. The timing adjustment may be calculated dynamically by observation, and the request timing adjusted accordingly to maintain the proper balance of efficiency and response times.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a wading or monitoring period of unspecified duration between enumerated steps of the depicted method. Additionally, the order in which a particular method occurs may or may not strictly adhere to the order of the corresponding steps shown.

Figure 5:
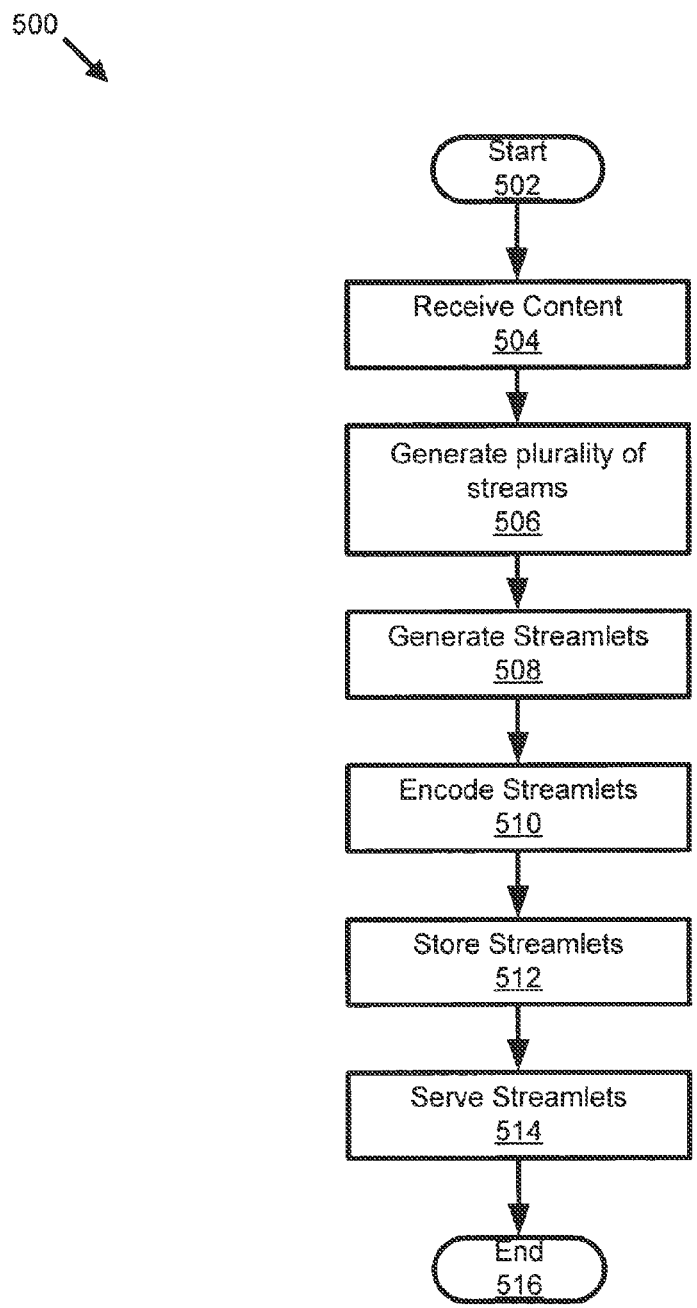
FIG. 5 is a schematic flow chart diagram illustrating one embodiment of a method for processing content in accordance with the present invention.

FIG. 5 is a schematic flowchart diagram illustrating one embodiment of a method 500 for processing content in accordance with the present invention. In one embodiment the method 500 starts 502, and the content module 112 receives 504 content from the publisher 110. Receiving content 504 may comprise receiving 504 a digital copy of the content file 200, or digitizing a physical copy of the content file 200. Alternatively, receiving 504 content may comprise capturing a radio or television broadcast. Once received 504, the stream module 302 generates 506 a plurality of streams 202, each stream 202 having a different quality. The quality may be predefined, or automatically set according to end user bandwidth, or in response to pre-designated publisher guidelines The streamlet module 304 receives the streams 202 and generates 508 a plurality of streamlets 212. In one embodiment, generating 508 streamlets comprises dividing the stream 202 into a plurality of two second streamlets 212. Alternatively, the streamlets may have any length less than or equal to the length of the stream 202, The encoder module 306 then encodes 510 the streamlets according to a compression algorithm. In a further embodiment, the algorithm comprises a proprietary codec such as WMV9®. The encoder module 306 then stores 512 the encoded streamlets in the streamlet database 308. Once stored 512, the web server 116 may then serve 514 the streamlets. In one embodiment, serving 514 the streamlets comprises receiving streamlet requests from the client module 114, retrieving the requested streamlet from the streamlet database 308, and subsequently transmitting the streamlet to the client module 114. The method 500 then ends 516.

Figure 6:
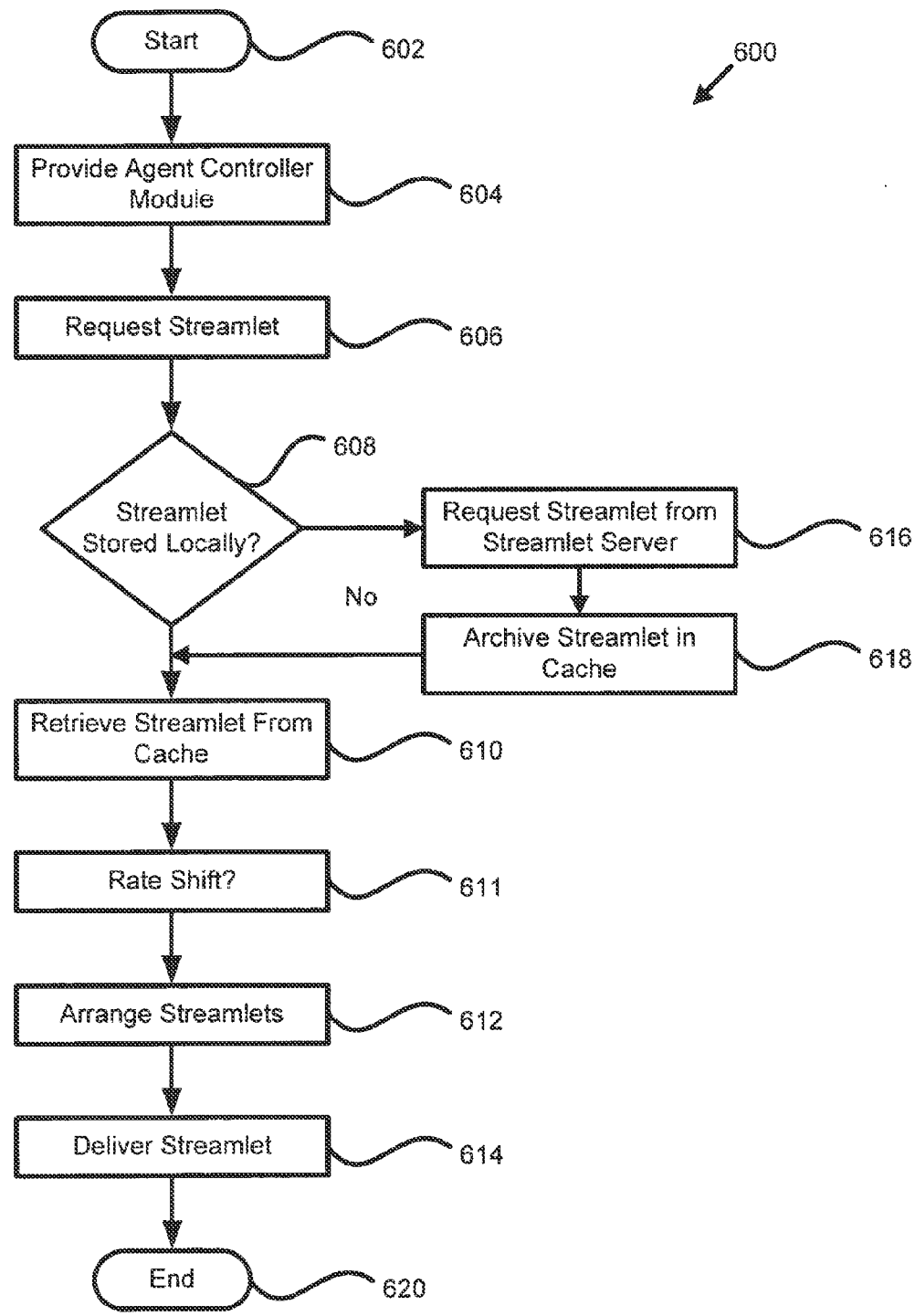
FIG. 6 is a schematic flow chart diagram illustrating one embodiment of a method for playback of a plurality of streamlets in accordance with the present invention.

FIG. 6 is a schematic flow chart diagram illustrating one embodiment of a method 600 for viewing a plurality of streamlets in accordance with the present invention. The method 600 starts and an agent control module 402 is provided 604 and associated with a viewer 408 and provided with a staging module 409. The agent controller module 402 then requests 606 a streamlet from the streamlet cache module 404. Alternatively, the agent controller module 402 may simultaneously request 606 a plurality of streamlets from the streamlet cache module 404. If the streamlet is stored 608 locally in the streamlet cache 410, the streamlet cache module 404 retrieves 610 the streamlet and sends the streamlet to the agent controller module 402. Upon retrieving 610 or receiving a streamlet, the agent controller module 402 makes 611 a determination of whether or not to shift, to a higher or lower quality stream 202. This determination will be described below in greater detail with reference to FIG. 7.

In one embodiment, the staging module 409 then arranges 612 tire streamlets into the proper order, and the agent controller module 402 delivers 614 the streamlets to the viewer 408. In a further embodiment, delivering 614 streamlets to the end user comprises playing video and or audio streamlets on the viewer 408. If the streamlets are not stored 608 locally, the streamlet request is passed to the network controller module 406. The network controller module 406 then requests 616 the streamlet from the web server 116. Once the streamlet is received, the network controller module 406 passes the streamlet to the streamlet cache module 404. The streamlet cache module 404 archives 618 the streamlet. Alternatively, the streamlet cache module 404 then archives 618 the streamlet and passes the streamlet to the agent controller module 402, and the method 600 then continues from operation 610 as described above.

Figure 7:
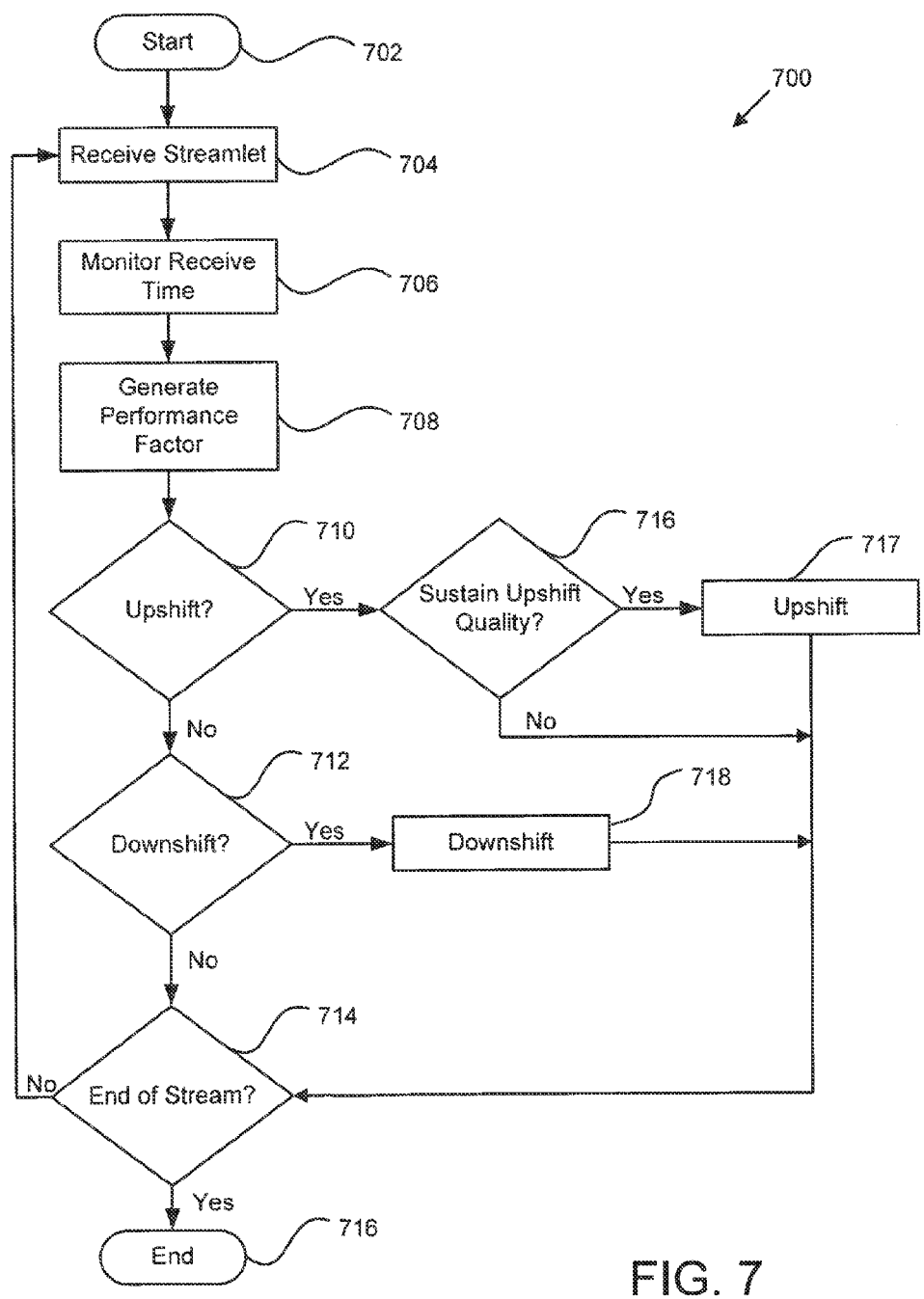
FIG. 7 is a schematic flow chart diagram illustrating one embodiment of a method for requesting streamlets within an adaptive-rate content streaming environment in accordance with the present invention.

Referring now to FIG. 7, shown therein is a schematic flow chart diagram illustrating one embodiment of a method 700 for requesting streamlets within a adaptive-rate shifting content streaming environment in accordance with the present invention. The method 700 may be used in one embodiment as the operation 611 of FIG. 6. The method 700 starts and the agent controller module 402 receives 704 a streamlet as described above with reference to FIG. 6. The agent controller module 402 then monitors 706 the receive time of the requested streamlet. In one embodiment, the agent controller module 402 monitors the time intervals Δ between successive receive times for each streamlet response. Ordering of the responses in relation to the order of their corresponding requests is not relevant.

Because network behavioral characteristics fluctuate, sometimes quite suddenly, any given Δ may vary substantially from another. In order to compensate for this fluctuation, the agent controller module 402 calculates 708 a performance ratio r across a window of n samples for streamlets of playback length S. In one embodiment, the performance ratio r is calculated using the equation $$r = S \frac{n}{\sum_{i=1}^{n} \Delta_i},$$

Due to multiple simultaneous streamlet processing, and in order to better judge the central tendency of the performance ratio r, the agent control module 402 may calculate a geometric mean, or alternatively an equivalent averaging algorithm, across a window of size m, and obtain a performance factor φ:

$$\varphi_{current} = \left( \prod_{j=1}^{m} r_j \right)^{\frac{1}{m}}.$$

The policy determination about whether or not to upshift 710 playback quality begins by comparing $\phi_{current}$ with a trigger threshold $\Theta_{up}$. If $\phi_{current} \geq \Theta_{up}$, then an up shift to the next, higher quality stream may be considered 716. In one embodiment, the trigger threshold $\Theta_{up}$ is determined by a combination of factors relating to the current read ahead margin (i.e. the amount of contiguously available streamlets that have been sequentially arranged by the staging module 409 for presentation at the current playback time index), and a minimum safety margin. In one embodiment, the minimum safety margin may be 24 seconds. The smaller the read ahead margin, the larger $\Theta_{up}$ is to discourage upshifting until a larger read ahead margin may be established to withstand network disruptions. If the agent controller module 402 is able to sustain 716 upshift quality, then the agent controller module 402 will upshift 717 the quality and subsequently request higher qualify streams. The determination of whether use of the higher quality stream is sustainable 716 is made by comparing an estimate of the higher quality stream's performance factor, $\phi_{higher}$, with $\Theta_{up}$. If $\phi_{higher} \geq \Theta_{up}$ then use of the higher quality stream is considered sustainable. If the decision of whether or not the higher stream rate is sustainable 716 is "no," the agent control module 402 will not attempt to upshift 717 stream quality. If the end of the stream has been reached 714, the method 618 ends 716.

If the decision on whether or not to attempt upshift 710 is "no", a decision about whether or not to downshift 712 is made. In one embodiment, a trigger threshold $\Theta_{down}$ is defined in a manner analogous to $\Theta_{up}$. If $\phi_{current} > \Theta_{down}$ then the stream quality may be adequate, and the agent controller module 402 does not downshift 718 stream quality. However, if $\phi_{current} \leq \Theta_{down}$, the agent controller module 402 does downshift 718 the stream quality. If the end of the stream has not been reached 714, the agent controller module 402 begins to request and receive 704 lower quality streamlets and the method 618 starts again. Of course, the above described equations and algorithms are illustrative only, and may be replaced by alternative streamlet monitoring solutions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An end user station for adaptive-rate content streaming of digital content from a video server over a network, the end user station comprising:
   a media player operating on the end user station configured to stream a video from the video server via at least one transmission control protocol (TCP) connection over the network, wherein multiple different copies of the video encoded at different bit rates are stored on the video server as multiple sets of files, wherein each of the files yields a different portion of the video on playback, wherein the files across the different copies yield the same portions of the video on playback, and wherein each of the files comprises a time index such that the files whose playback is the same portion of the video for each of the different copies have the same time index in relation to the beginning of the video, and wherein the media player streams the video by:
   requesting a plurality of sequential files of one of the copies from the video server based on the time indexes;
   automatically requesting from the video server subsequent portions of the video by requesting for each such portion one of the files from one of the copies dependent upon successive determinations by the media player to shift the playback quality to a higher or lower quality one of the different copies, the automatically requesting including repeatedly generating a factor indicative of the current ability to sustain the streaming of the video using the files from different ones of the copies, wherein the set of one or more factors relate to the performance of the network;
   making the successive determinations to shift the playback quality based on the factor to achieve continuous playback of the video using the files of the highest quality one of the copies determined sustainable at that time so that the media player upshifts to a higher quality one of the different copies when the factor is greater than a first threshold and downshifts to a lower quality one of the different copies when the factor is less than a second threshold; and
   presenting the video by playing back the requested media files with the media player on the end user station in order of ascending playback time.

2. The end user station of claim 1, wherein the at least one TCP connection comprises multiple Transmission Control protocol (TCP) connections with the content server.

3. The end user station of claim 1, wherein the media player is configured to generate the factor according to the responses to segment requests.

4. The end user station of claim 1, wherein the media player is configured to upshift to the higher quality copy when the factor is greater than the first threshold and the media player determines the higher quality playback can be sustained according to a combination of factors.

5. The end user station of claim 1 wherein the media player is configured to upshift to the higher quality copy when the performance factor is greater than the first threshold and the media player determines that the higher quality playback can be sustained according to an amount of contiguously available files stored by the media player.

6. The end user station of claim 1, wherein the media player is further configured to anticipate file requests and to pre-request files to enable fast-forward, skip randomly, and rewind functionality.

7. The end user station of claim 1, wherein the media player is configured to initially request low quality files to enable instant playback of the video, and to subsequently upshift to a better quality copy of the video according to the performance factor.

8. A method executable by an end user station to present rate-adaptive streams received via at least one transmission control protocol (TCP) connection with a server over a network, the method comprising;
   streaming, by a media player operating on the end user station, a video from the server via the at least one TCP connection over the network, wherein multiple different copies of the video encoded at different bit rates are stored as multiple sets of files on the server, wherein each of the files yields a different portion of the video on playback, wherein the files across the different copies yield the same portions of the video on playback, and wherein each of the files comprises a time index such that the files whose playback is the same portion of the video for each of the different copies have the same time index in relation to the beginning of the video, and wherein the streaming comprises:
   requesting by the media player a plurality of sequential files of one of the copies from the server based on the time indexes;
   automatically requesting by the media player from the server subsequent portions of the video by requesting for each such portion one of the files from one of the copies dependent upon successive determinations by the media player to shift the playback quality to a higher or lower quality one of the different copies, the automatically requesting including repeatedly generating a factor indicative of the current ability to sustain the streaming of the video using the files from different ones of the copies, wherein the factor relates to the performance of the network; and
   making the successive determinations to shift the playback quality based on the factor to achieve continuous playback of the video using the files of the highest quality one of the copies determined sustainable at that time, wherein the making the successive determinations to shift comprises upshifting to a higher quality one of the different copies when the at least one factor is greater than a first threshold and downshifting to a lower quality one of the different copies when the at least one factor is less than a second threshold; and
   presenting the video by playing back the requested media files with the media player on the end user station in order of ascending playback time.

9. The method of claim 8, wherein the at least one TCP connection comprises a plurality of different TCP connections, and wherein the requesting the plurality of sequential files includes requesting sub-parts of the files over different ones of the plurality of different TCP connections, and wherein said presenting includes reassembling the files from the received sub-parts.

10. The method of claim 8, wherein said making the successive determinations to shift comprises:
   determining if the higher quality playback can be sustained.

11. The method of claim 8, wherein the at least one TCP connection comprises a plurality of different TCP connections, and wherein the automatically requesting includes requesting sub-parts of the files over different ones of the plurality of TCP connections, and wherein said presenting includes reassembling the files from the received sub-parts, and wherein the factor is indicative of the available bandwidth of the plurality of TCP connections.

12. The method of claim 8, wherein the factor is indicative of latency of the requested files, wherein the latency is a time measure between when one of the requests is issued and a time that response data of the request begins to arrive at the end user station.

13. The method of claim 8, wherein the factor is indicative of time intervals between successive receive times for each response to the requested files.

14. The method of claim 8, wherein the factor is indicative of delays or losses in one or more of the at least one TCP connection.

15. The method of claim 8, wherein the server is a web server, and wherein the files are requested from the web server using Hyper Text Transfer Protocol (HTTP) messages sent via the at least one TCP connection.

16. The method of claim 8, wherein the server comprises a cache server of a network infrastructure operator.

* * * * *